United States Patent [19]
Rorden

[11] Patent Number: 5,089,779
[45] Date of Patent: Feb. 18, 1992

[54] METHOD AND APPARATUS FOR MEASURING STRATA RESISTIVITY ADJACENT A BOREHOLE

[75] Inventor: Louis H. Rorden, Los Altos, Calif.

[73] Assignee: Develco, Inc., San Jose, Calif.

[21] Appl. No.: 581,561

[22] Filed: Sep. 10, 1990

[51] Int. Cl.⁵ .............................................. G01V 3/30
[52] U.S. Cl. ..................................... 324/339; 324/343
[58] Field of Search ............... 324/332, 333, 338, 339, 324/342, 343, 344, 356, 355, 366, 369; 343/720, 725, 729, 787, 853; 166/250, 251, 254, 255; 175/40, 45

[56] References Cited

U.S. PATENT DOCUMENTS

| | | | |
|---|---|---|---|
| 2,919,396 | 12/1959 | McLaughlin et al. | 324/335 |
| 2,963,640 | 12/1960 | Buckner, Jr. | 324/366 |
| 3,383,586 | 5/1968 | Hoehn, Jr. | 324/338 |
| 3,406,359 | 10/1968 | Welz et al. | 324/323 |
| 3,493,850 | 2/1970 | Schuster | 324/342 |
| 3,539,911 | 11/1970 | Youmans et al. | 324/343 |
| 3,748,573 | 7/1973 | Vogel | 324/369 |
| 4,061,967 | 12/1977 | Hall | 324/260 |
| 4,348,672 | 9/1982 | Givler | 340/854 |
| 4,387,372 | 6/1983 | Smith et al. | 340/854 |
| 4,451,789 | 5/1984 | Meador | 324/338 |
| 4,525,715 | 6/1985 | Smith | 340/854 |
| 4,609,873 | 9/1986 | Cox et al. | 324/338 |
| 4,651,101 | 3/1987 | Barber et al. | 324/339 |
| 4,670,717 | 6/1987 | Sender | 324/338 |
| 4,712,070 | 12/1987 | Clark et al. | 324/338 |
| 4,716,973 | 1/1988 | Cobera . | |
| 4,725,837 | 2/1988 | Rubin | 340/855 |
| 4,785,247 | 11/1988 | Meador et al. | 324/341 X |
| 4,786,874 | 11/1988 | Grosso et al. . | |
| 4,933,640 | 6/1990 | Kuckes | 324/343 X |
| 4,980,643 | 12/1990 | Gianzero et al. | 324/343 X |

*Primary Examiner*—Kenneth A. Wieder
*Assistant Examiner*—Warren S. Edmonds
*Attorney, Agent, or Firm*—Flehr, Hohbach, Test, Albritton & Herbert

[57] ABSTRACT

The method and apparatus relies on a modified induction approach and preferably is incorporated into a metal drill collar for MWD measurements. Directional nulls are created in a primary changing magnetic field formed in a formation by a transmitting antenna which is in a groove on the surface of the drilling collar. Detecting antennas are placed at the directional nulls to enable the primary magnetic field to be decoupled from the same and allow it to be distinguished from the secondary field caused by the current induced in the formation by such primary field. The drill collar also carries a plurality of current detectors which detect the value of current induced in the formation to provide a resistivity profile immediately adjacent the borehole. A preferred embodiment uses a hybrid modified induction and electrical approach.

36 Claims, 3 Drawing Sheets

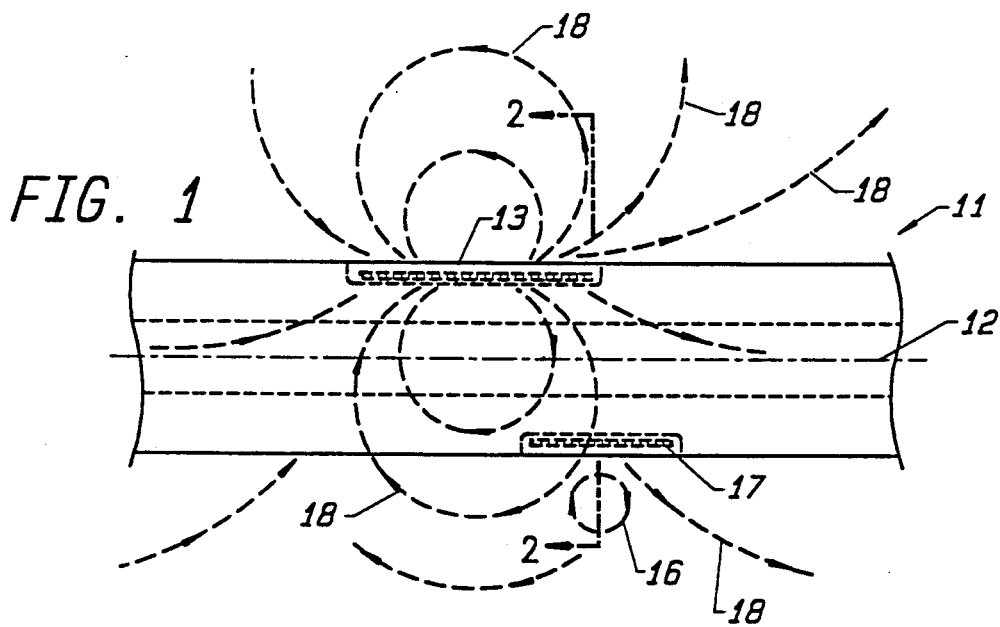
FIG. 1
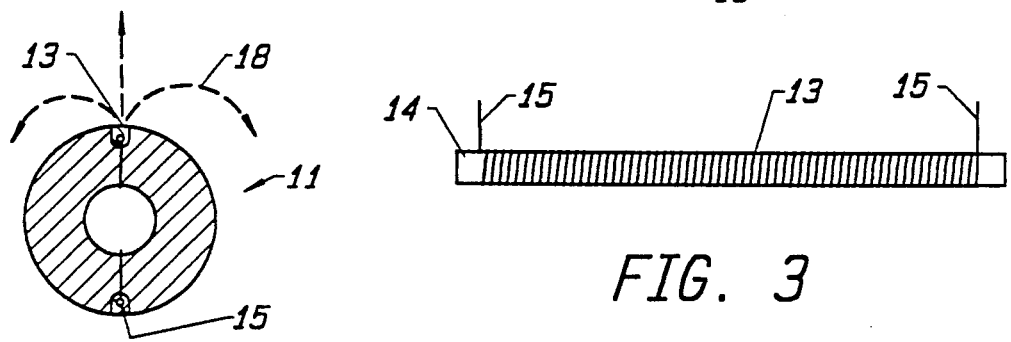
FIG. 2
FIG. 3
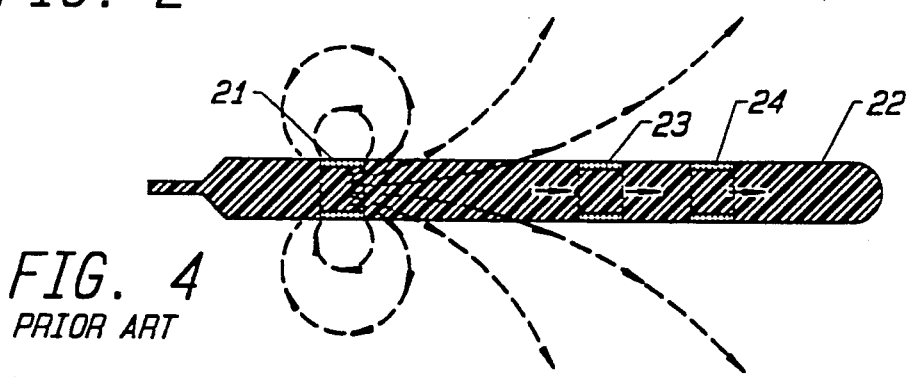
FIG. 4
PRIOR ART
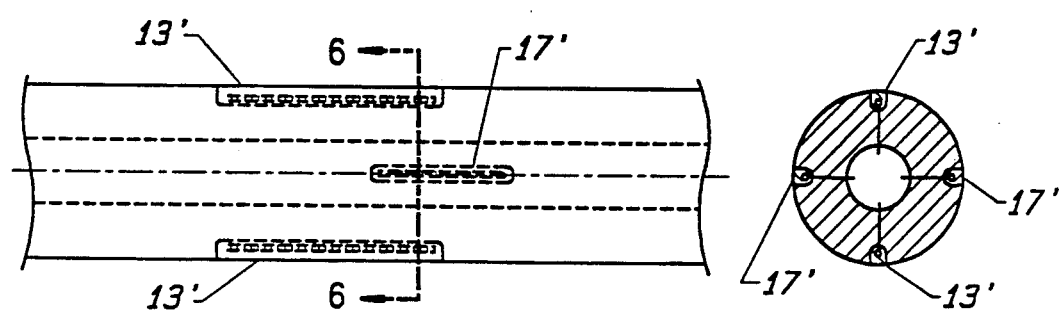
FIG. 5
FIG. 6

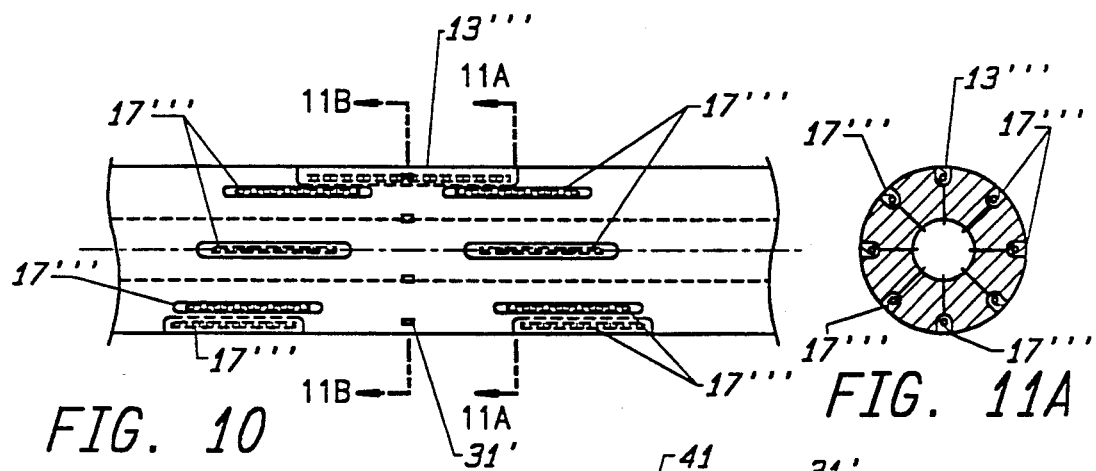
FIG. 10   FIG. 11A
FIG. 11B
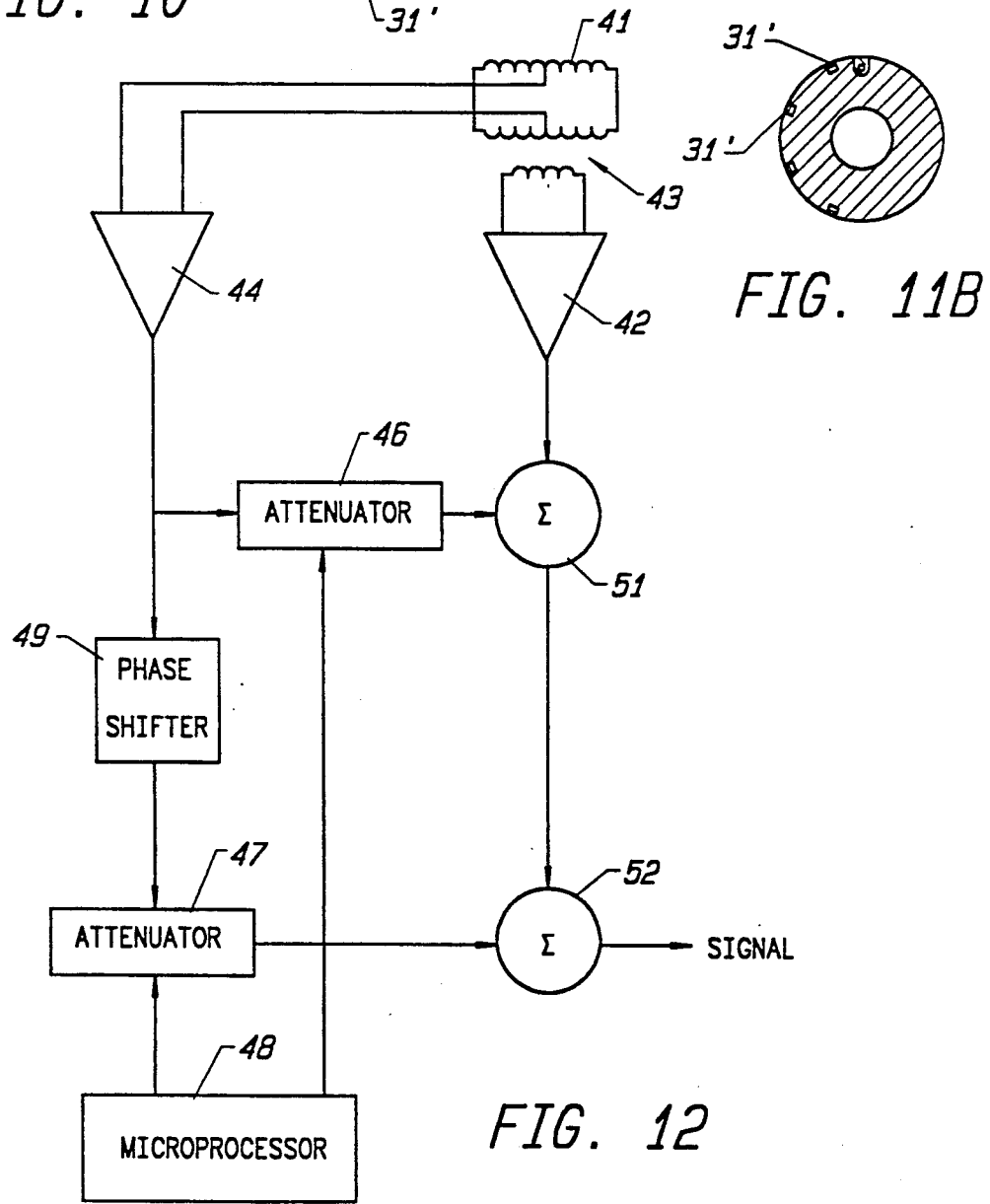
FIG. 12

METHOD AND APPARATUS FOR MEASURING STRATA RESISTIVITY ADJACENT A BOREHOLE

BACKGROUND OF THE INVENTION

The present invention relates to underground geologic and fossil fuel investigations and, more particularly, to a method and apparatus for determining the electrical resistivity of a formation adjacent a location in a borehole.

Electrical resistivity of formations surrounding boreholes is important in geological studies and investigations for fossil fuels. Because differing materials which might make up a formation have different resistivities, a measurement of the resistivity provides an indication of the formation make-up.

There now are basically two different approaches for measuring resistivity from boreholes. One is to position a so-called "electric" log instrument in the borehole. Such instrument forces current from the borehole through the external formation and measures the effect on such current of the make-up of the formation, by detecting resulting voltages at various locations. This type of log has been found to be particularly effective for obtaining resistivity measurements in high-resistivity formations. It often, though, requires a conductive borehole fluid to operate. This approach has also been adapted to measure-while-drilling (MWD) tools by assembling measurement electrodes on the metal drill collar normally provided between the actual drill and the main part of the drill stem. Because such metal drill collars are electrically conductive, the measurement electrodes must be insulated from one another to prevent shorting. The insulation provided on the drill collar in the past for this purpose has been exposed and consequently subject to severe erosion during actual drilling. Instruments and other arrangements utilizing the forced current approach are described in U.S. Pat. Nos. 2,963,640 and 4,451,789.

The second basic approach that has been used has been an induction approach. One or more (typically an array) of solenoids or the like are positioned in the borehole to develop a primary alternating magnetic field in the formation. This will induce a circulating electrical current within the formation, and the resulting secondary magnetic field is measured. This approach is generally effective in low-resistivity formations of the type likely to be encountered in sedimentary basins which contain petroleum reservoirs. Induction log instruments also have been found to work when the borehole includes a high-resistivity fluid. The approach does not lend itself well to MWD, though, because of the necessity of providing deep circumferential cuts or grooves in the outer diameter of the drill collar to avoid easily damaged protrusions. In this connection, it must be remembered that the ability of an antenna to generate a primary magnetic field or to sense an induced secondary field, depends on the amount of nonconducting cross-sectional area that such antenna has. The resulting deep undercuts in the outer diameter of the metal drill collar weakens it unacceptably. U.S. Pat. Nos. 2,919,396; 3,383,586; and 4,609,873 disclose instruments utilizing induction.

Both of these approaches rely on the formation of a primary electromagnetic field which is not distorted because of any electromagnetic conductivities other than those which might be caused by the formation to be measured. Instruments and other constructions utilizing either of these approaches normally operate at frequencies in the range of 10 to 200 kHz. The frequency of operation is high enough to avoid low-frequency noise but low enough to neglect capacitive current components, simplifying the equations that must be solved to obtain a description of the electromagnetic fields in the formation. A version of an induction instrument known as an "electromagnetic wave resistivity" (EWR) instrument has recently come into use. This name derives from its operation at a high enough frequency (about 2 MHz) that capacitive current cannot be neglected, and the equations describing the surrounding fields and the propagating wave modes must be considered. Although the geometry of EWR instruments is generally similar to that of conventional induction instruments, the shallower undercut permitted by its high-frequency operation has resulted in its use with standard MWD collars. However, the attenuation of waves travelling in a conducting formation increases with frequency. The result has been EWR arrangements provide lower depth of investigation in low resistivities than typically are of interest. As an example of the attenuation, at a resistivity of 0.2 ohm-meters the attenuation is greater than one decibel per inch of travel. In this connection, it also must be remembered that during MWD measurement it is necessary that the primary electromagnetic field which is induced travel through fluid (typically called a drilling "mud") which is circulated through the borehole.

SUMMARY OF THE INVENTION

The present invention relates to a method and apparatus incorporating a modified induction approach, which not only can be used with an electromagnetically conductive material such as an MWD drill collar, but takes advantage of its conductivity. In fundamental terms, a major aspect of the invention is directed to taking advantage of the null locus of a component of a primary changing magnetic field formed in a formation, and placing detecting antennas at specific positions selected relative to the null enabling the primary magnetic field to be distinguished from the secondary field caused by the current induced in the formation by the primary field. Most desirably, each of the detecting antennas is positioned right at a null so as to be directly decoupled from the primary field pattern, eliminating the necessity of canceling the primary field by, for example a "bucking" connection of receiving antennas.

The transmitting antenna(s) and the detecting antenna(s) are not positioned circumferentially about the drill collar. Rather, they are placed in corresponding grooves or the like on the drill collar's exterior surface. In this connection, the antennas can be generally elongated and preferably include a magnetic core. As brought out above, in the past it has been necessary to provide relatively deep cuts or grooves in the outer diameter of a drill collar to, among other things, provide the nonconducting cross-sectional area for the antenna that is required. The instant invention allows the inclusion of a magnetic core to concentrate the flux, thereby reducing the cross-sectional area that is needed.

As another feature of the invention, the support structure for the antennas is electrically conductive and carries a plurality of current detectors but in insulated relationship thereto. Each of the detectors is positioned to detect the value of current being received by the same from the formation. In this connection, the detectors are positioned at differing radial positions relative to the axis of the support structure, whereby each detects a different value of current. These currents will respectively flow through successively deeper layers of the formation. This set of measurements then produces an estimate of the radial resistivity profile of the formation immediately adjacent the borehole.

It will be recognized that the above current measuring technique is the result of using a magnetic field source that is not axially symmetric, i.e., that is off-axis relative to the borehole axis. The off-axis relationship of one or more of the antennas may also allow determination of bedding plane dip and the direction of a bedding plane.

As another feature of the invention, if a plurality of detecting antennas provided at nominal directional nulls, the signals provided by each will have certain common characteristics. Since this common mode is a direct response to the actual primary field, it does not have to be compensated for the first-order effects of mud resistivity, collar temperature, drive amplitude, etc. Means are provided to inject the necessary levels of in-phase and quadrature common mode into the main signal channel to compensate for the second-order null residuals.

The primary magnetic field, defined as that field which exists in the absence of any conducting formation or borehole fluid, is a composite field made up not only of the field created by the transmitting antenna, but also by the field created by the electrical current induced in the conductive drill collar itself.

The primary field pattern can be synthesized by energizing several transmitting antennas simultaneously. This modifies the null loci and, hence, the placement of the detecting antenna(s). Moreover, plural null loci can be formed to permit a more extensive distribution of detecting antennas. It is also possible to place additional detecting antennas in positions that are not selected based on the null loci, using appropriate weighting of multiple elements to achieve cancellation as in conventional logs.

BRIEF DESCRIPTION OF THE DRAWINGS

With reference to the accompanying three sheets of drawings:

FIG. 1 is a schematic, broken side elevation view of a drill collar illustrating the invention;

FIG. 2 is a sectional view taken on a plane indicated by the lines 2—2 in FIG. 1;

FIG. 3 is a schematic elevation view of an antenna of the type utilized with the invention;

FIG. 4 is a view similar to FIG. 1 but showing a conventional wire-line induction instrument for making resistivity measurements;

FIG. 5 is a view similar to FIG. 1 showing an alternate configuration of antennas;

FIG. 6 is a sectional view similar to FIG. 2 taken on a plane indicated by the lines 6—6 in FIG. 5;

FIG. 10 is another schematic view similar to that of FIG. 1 illustrating a plurality of magnetic field detectors at symmetrically located directional nulls and a plurality of current detectors;

FIG. 11A is a sectional view similar to FIG. 1 taken on a plane indicated by the lines 11A-11A in FIG. 10;

FIG. 11B is another sectional view taken on a plane indicated by the lines 11B—11B in FIG. 10; and FIG. 12 is a schematic block diagram view of a preferred receiving channel of the invention.

DETAILED DESCRIPTION OF THE PREFERRED EMBODIMENTS

Figure 7:
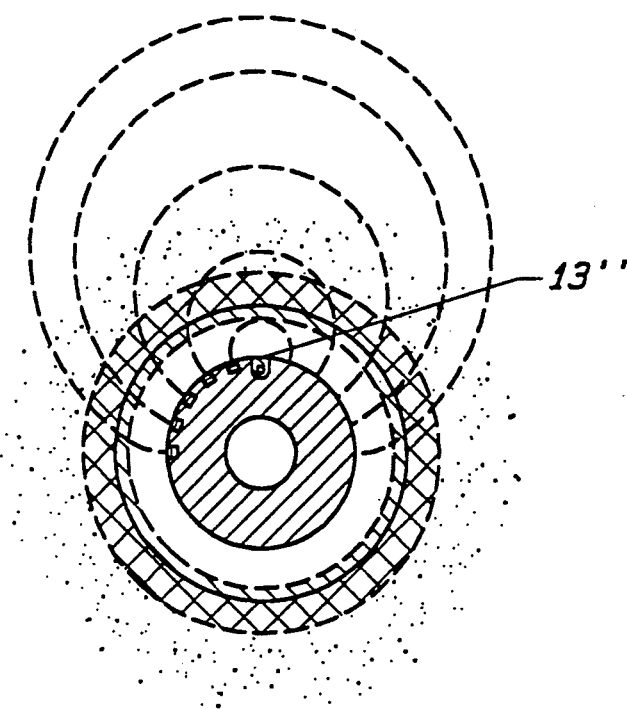
FIG. 7 is a schematic sectional view of an arrangement according to the invention showing the electric field in the formation adjacent a borehole.

FIGS. 1 and 2 illustrate the fundamental principles of the instant invention, and FIG. 3 is included for a better understanding of the same. With reference to FIGS. 1 and 2, a schematic representation 11 of a metal drill collar is illustrated. As is known, such a drill collar is located between the drilling stem or pipe and the drilling bit during the formation of a borehole. Collar 11 includes a main axis 12 which when the structure is within a borehole is meant to be generally coincident with the borehole central axis, i.e., a line drawn centrally through the borehole along its length. Collar 11 is typical in that it is metal-metal is generally used for drill collars to impart weight and strength.

MWD (Measure-While-Drilling) is accomplished by instrumentation which is associated with the metal drill collar. As mentioned above, the two approaches which have been used in the past to measure the resistivity of a formation surrounding the borehole have not been adapted satisfactorily to MWD operation. One reason for this is that, because the drilling collar typically is electrically conductive, induction type approaches have required a relatively deep circumferential groove to be formed in the drill collar to house the antenna(s).

The present invention takes advantage of the electrically conductive nature of the drill collar. It has been found that if the transmitting antenna(s) is positioned off-axis of the main axis of the collar, i.e., radially offset from the borehole central axis, a changing primary magnetic field is formed which has locii of axial component minima on the collar surface. That is, a "primary" magnetic field is formed which has a location at which the direction of the axial component of the field nominally in-phase with the antenna field will reverse. The locus of this reversal is referred to herein as a "directional null." Since the magnetic field of the transmitting antenna induces a current in the metal collar itself, the primary magnetic field as used herein is actually a composite field made up by the superposition of the magnetic field created by the transmitting antenna directly, and the secondary field created by the current which is induced in the conducting collar.

Most desirably, the transmitting antenna 13 is located on or near a surface of the drill collar by, for example, being placed within a groove as illustrated. As shown in FIG. 3, such transmitting antenna 13 is made up of an elongate cylindrical or rod shaped magnetically highly permeable core 14 which is spirally wrapped with conductive wire 15. This construction will result in optimum flux transmission since flux in the antenna itself formed by current flowing through the wire 15 will be concentrated by the rod 14.

It has been determined that a directional null represented at 16 will be formed on the surface of the drill collar circumferentially about the same. In keeping with the invention, the detecting antenna for detecting the field produced by the current induced in the formation is positioned at a location relative to such null at which such secondary magnetic field is distinguishable from the primary magnetic field. Moreover, for maximum depth of investigation when a single detecting antenna is used, it is preferable that it be diametrically opposite the transmitting antenna. Antenna 17 is such a detecting antenna. Its construction is similar to that of the transmitting antenna 13. Most desirably it is decoupled from the primary magnetic field by being positioned right at the null. It must be remembered, though, that such detecting antenna has a finite length, and when there is discussion in this document about positioning the detecting system at the null it is meant positioning the detecting antenna for nominal zero output.

Although a perfect directional null theoretically will occur, this is with the assumption that the collar is a perfect conductor. The practical case of finite conductivity results in a very deep minimum, but with some residual quadrature component which must be compensated for to assure proper operation.

Field lines 18 are superimposed on the drawing in FIG. 1 to show the nature of the primary magnetic field. This field is a composite of the field created outside the collar by the transmitting antenna, and a projection on the plane of such field, of the secondary field caused by current induced in the conducting collar. As shown, the field at the surface and outside the collar in the transverse bisecting plane of the transmitting antenna 13 is everywhere axial and directed oppositely to the field in the antenna core. It will be recognized that the directional null locus in fact circumscribes the metal collar. Moreover, there will be two null locii that are formed about a plane bisecting the transmitting antenna, axially symmetric of the collar 11 relative to the collar main axis 12. Simultaneous resistivity measurements therefore can be made with axial separation. These could be used as array elements to synthesize different investigation patterns, or on a rotating collar to assist in determining apparent bedding plane dip.

FIG. 4 is included to facilitate an understanding of the instant invention. It illustrates the field formed by a conventional wire line log arrangement. Such arrangement includes a transmitter coil 21 which is embedded in a nonelectrically conducting, elongated body 22. Since such body is non-conductive, the magnetic flux pattern of the primary field formed by the transmitter coil 21 will not be "distorted" by the existence of such body. Although for simplicity the flux pattern is only shown in two dimensions, it will be recognized that there is a three-dimensional flux pattern which is simply an axially-symmetric figure of revolution of that shown.

A conventional arrangement as shown in FIG. 4 typically includes two separate receiver coils. These coils, represented at 23 and 24, are positioned on the body so that the current induced in the same will be in phase. The amplitudes of the current caused by the primary magnetic field will be approximately inverse to the cube of their respective distances from the transmitting coil 21. To eliminate primary field bias of the log output, the direct coupling of the primary field is canceled out by using the appropriately weighted differences of signals induced in these two coils. In other words, it is necessary to have two receiving coils to enable elimination of primary field bias. Two receiving coils are not necessary for the instant invention, although, if desired, multiple detecting (or transmitting) antennas may be used to synthesize different depth-/resolution patterns. Moreover, the scheme of the instant invention enables one to place the detecting and transmitting antennas much closer to one another and takes much less power than a conventional arrangement.

FIGS. 5 and 6 illustrate a simple array using two transmitting antennas 13' which are diametrically opposed to one another and two receiving antennas 17' which are also diametrically opposed to one another, but in a plane perpendicular to the plane of the transmitting antennas. The simplest electrical configuration for this array is one in which each antenna pair is connected either in parallel or in series, resulting in a single transmitting channel and a single receiving channel. This geometry is less sensitive to circumferential inhomogeneities of formation resistivity than the unsymmetrical configuration illustrated in FIGS. 1 and 2. Moreover, it has somewhat better thin-bed resolution. By the simple expedient of detecting the signals from the two receiving antennas separately and correlating with rotation during rotary drilling by, for example, using data from directional sensors incorporated in the tool, bedding plane dip and strike can be resolved.

Figure 8:
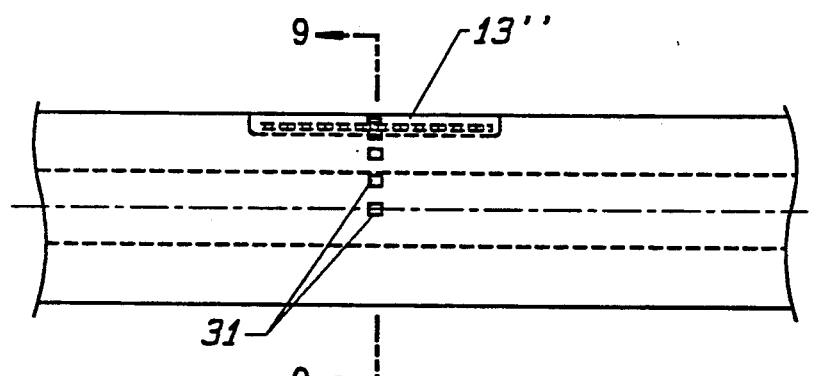
FIG. 8 is a view similar to FIG. 1 showing the antenna arrangement in combination with a current detecting scheme of the invention.
Figure 9:
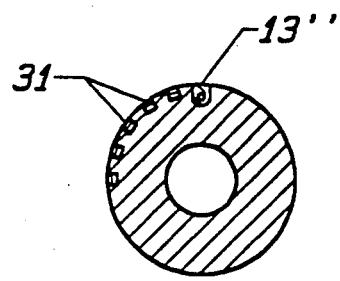
FIG. 9 is a view similar to FIG. 2 taken on a plane indicated by the lines 9—9 in FIG. 8.

The use of a transmitting antenna that is not axially symmetric provides a different approach to resistivity measurement. FIG. 7 is included to facilitate an understanding of this approach. It depicts lines representing the electrical field induced by the primary magnetic field in the vicinity of the central plane of a transmitting antenna 13" in a drill collar represented in cross-section. These electric field lines are superimposed on the radial resistivity zones that can be differentiated adjacent a drilling collar in a borehole. Except for distortions introduced by boundary conditions between zones, conduction currents will tend to follow these electrical field lines. As illustrated, all of the hybrid current paths are intercepted by the collar at a normal incidence required by its high conductivity. This completes the closed conduction paths. In keeping with the invention, an array of electrodes 31 are positioned to intercept these currents, each of which will flow through a successively deeper layer of the formation. This array is best illustrated in FIGS. 8 and 9. It will be appreciated that each of these electrodes is insulated from the collar's surface but is maintained at the collar potential. A set of measurements of voltages resulting from these currents will produce an estimate of the radial resistivity profile to a depth of several collar radii into the formation. It should be noted that although the array of electrodes are shown in particular positions on the collar surface relative to the transmitting antenna, other positions on such surface for the electrodes could be selected, depending upon the current it is desired to intercept.

Note that the hybrid current paths illustrated in FIG. 7 are radially well collimated and can therefore provide excellent bedding-plane resolution. In spite of providing relatively shallow investigation, this measurement is useful for lithography while invasion is still shallow. Also, the hybrid profile is useful for borehole-fluid corrections of the deeper investigation provided by the induction mode of the same configuration. Moreover, its radial resolution should aid estimation of formation permeability by tracing the progress of invasion, particularly when a previously-drilled interval is logged back during tripping.

FIGS. 10 through 11B show a preferred arrangement combining both the magnetic sensing and current sensing aspects of the invention. A transmitting antenna is represented at 13". A plurality of detecting antennas 17' are positioned circumferentially about the drill collar at the two circumferential directional nulls formed on opposite sides of the transmitting antenna. Moreover, a plurality of detectors 31' are positioned to detect current.

The unique geometries of the invention permit the use of magnetic excitation with current sensing that can be constructed to have very high resolution both radially and axially. Although limited to relatively shallow investigation, it can be used to resolve invasion profiles, compensate for borehole effects, and resolve thin beds in a freshly-drilled hole. The combination of magnetic sensing with induced current sensing results in an arrangement which provides both shallow and deep investigations.

Another feature of the instant invention is the presence of a common-mode signal from each receiving antenna that can be used to suppress the residual primary-field response to the nominal directional null. Since this common mode is a direct response to the actual primary field, compensation does not have to be made for the first-order effects of mud resistivity, collar temperature, drive amplitude, etc. Instead, a microprocessor controller can be provided to inject the necessary levels of in-phase and quadrature common-mode into the main signal channel to compensate for the second and higher order null residuals, following a model constructed from test measurements. In other words, the detecting antenna can have a controller for adding constant characteristics of a signal to the current induced in the same, to compensate for signal characteristics caused by the primary magnetic field.

FIG. 12 schematically illustrates such a receiver channel. The current induced by the primary field has a signal value over the length of the receiving antenna(s). However, in the preferred arrangement the receiving antenna(s) span(s) a directional null. Such an antenna, represented at 41, is coupled to a main signal preamplifier 42 through a transformer 43 with a center-tapped primary winding. Since the current induced by the primary field reverses polarity near the antenna center, the common-mode voltage between the antenna and transformer center taps will be proportional to the sum of magnitudes of the response of the antenna halves to the primary field. These will be canceled to the first order. At the same time, the secondary signals of interest will be in phase over the length of the antenna, creating a differential signal that is delivered to the signal preamplifier 42. A common-mode preamplifier 44 is connected between the center taps of the detecting antenna as illustrated. It amplifies the primary field replica, with the secondary response canceled. This preamplifier drives a pair of microprocessor-controlled attenuators 46 and 47 (the microprocessor is represented at 48). As illustrated, attenuator 47 is driven by the preamplifier 44 through a phase-shifting network represented at 49. The attenuators 46 and 47 implement the modeled second-order primary field directional nulls provided by the microprocessor controller. The signals are summed with the output from the main signal preamplifier as is represented at 51 and 52. The outside signal is the desired detection signal with the common mode signal removed.

Preferably, preamplifiers 42 and 44 sense current rather than voltage, since short-circuit current is essentially independent of core permeability, which can change with temperature and stress.

It is also preferable to operate this system over a wide range of frequencies, such as from 2 to 200 kHz. The higher frequencies achieve sensitivity for investigation of high resistivity formations but if used alone result in excessive propagation loss and distortion in low resistivities. With microprocessor 48 available, the frequency can be adjusted to maintain adequate sensitivity and consistent depth of investigation with minimum skin-effect correction. A preferred method of achieving this flexibility is to use broad band signal conditioning electronics, eliminating the need for multiple filters and multi-phase current detection thereby preserving both amplitude and phase of the signal without contamination by out-of-band noise.

In addition to the ability to operate over a wide frequency range without degradation, this approach permits simultaneous analysis at multiple frequencies by transmitting a harmonic-rich waveform. For instance, with square-wave drive and a scanning synchronous detector array that samples the signal in contiguous time segments each 1/16th of a cycle long, the amplitude and phase of the fundamental, third, fifth and seventh harmonics may all be determined. A well-known technique which could be used would be the Fast Fourier Transform method. The response could also be analyzed using this detection method, as a transient in the time domain, of course, rather than first transforming it into the frequency domain.

It will be apparent from the above that the invention is an apparatus and a method for a new approach to resistivity measurement which can be used in an MWD collar without weakening it. Because of the unique field pattern which is created, the sensing elements can be placed much closer to the source elements than in conventional induction or electrical approaches. This permits a very short assembly, one-half to one-fourth the length of conventional MWD resistivity logs, and lower power consumption because of the higher efficiency of magnetic-cored antennas and the shorter path travelled by investigation signals.

It will also be seen that antennas can be placed in configurations designed to resolve circumferential inhomogeneities of resistivity, such as are encountered in dipping bed measurements, because the investigation patterns are not axially symmetric. By combining channels with different weighting, patterns of various resolutions and depths of investigation can be synthesized simultaneously. The use of asymmetric antenna arrays of the invention permits resolution of bedding planes parallel or inclined to a tool axis. This property is particularly valuable in horizontal drilling where it is frequently desirable to drill at a constant distance from some interface.

The balanced configuration of receiving antennas provided by some implementations of the instant invention results in a strong common-mode response to the primary field, facilitating computer-controlled null compensation. The scanning synchronous detector array allows simultaneous analysis at multiple frequencies or analysis in the time domain.

Although the invention has been described in connection with preferred embodiments, it will be recognized by those skilled in the art that various changes and variations can be made and that the principles are applicable to many resistivity measurement geometries. For example, it can be used in conventional induction log or EWR configurations by replacing each undercut solenoid by a collar containing several magnetic-cord axial antennas of the invention in slots. Such arrangements would have virtually the same responses as the originals. They would benefit from the full-strength collar and from the minimal exposure of insulating material to abrasion.

It will be realized that the primary field pattern could be synthesized by driving several elements simultaneously. This would modify the null loci and the placement of receiving antennas. Moreover, receiving antennas could be located in positions that are not associated with nulls, and appropriate weighting of multiple elements to achieve cancellation could be used, as in conventional logs. It is therefore intended that the coverage afforded applicant be limited only by the claims and their equivalents.

What is claimed is:

1. In apparatus for measuring the resistivity of a formation surrounding a borehole having a central axis, the combination comprising:
   (a) a first, axially asymmetric antenna for forming a changing primary magnetic field within said formation;
   (b) a supporting structure for said antenna to be placed in said borehole, which structure has a main axis meant to be generally coincident with said borehole central axis when said structure is in said borehole;
   (c) a second detecting antenna for detecting the secondary magnetic field resulting from the electrical current induced in said formation, positioned at the location of a null in said primary magnetic field; and
   (d) said first and second antennas being supported by said support structure at positions which are radially offset from said main axis, said supporting structure being generally cylindrical, and said first and second antennas being positioned in corresponding grooves in the exterior surface thereof.

2. The apparatus of claim 1 wherein said supporting structure is electrically conductive and said first antenna induces electrical current therein, said changing primary magnetic field being a composite field including the field formed in said formation by transmission from said antenna and the magnetic field due to current induced within said supporting structure by transmission from said first antenna.

3. The apparatus of claim 2 wherein said detecting antenna is generally decoupled from said primary magnetic field.

4. The apparatus of claim 2 wherein there are a pair of detecting antennas, each of which is generally opposed to the other relative to said borehole central axis.

5. The apparatus of claim 1 wherein said first antenna is supported by said support structure at a position which is radially offset from said main axis.

6. The apparatus of claim 5 wherein said second antenna is also supported by said support structure at a position radially offset from said support structure main axis.

7. The apparatus of claim 1 further including a plurality of said detecting antennas located at differing distances from said first antenna.

8. The apparatus of claim 1 wherein means are connected to said detecting antenna responsive to electrical current induced therein upon the detection of said secondary magnetic field, which means includes a controller for adding constant characteristics of a signal to said induced current to compensate for signal characteristics caused by said primary magnetic field.

9. The apparatus of claim 1 wherein there is an array of detecting antennas.

10. In apparatus for measuring the resistivity of a formation surrounding a borehole having a central axis, the combination comprising:
    (a) a first, axially asymmetric antenna for forming a changing primary magnetic field within said formation;
    (b) a supporting structure for said antenna to be placed in said borehole, which structure has a main axis meant to be generally coincident with said borehole central axis when said structure is in said borehole;
    (c) a second detecting antenna for detecting the secondary magnetic field resulting from the electrical current induced in said formation, positioned at the location of a null in said primary magnetic field; and
    (d) means radially off-set from said main axis for measuring from said borehole, different values of current induced within said formation at respectively differing distances.

11. The apparatus of claim 10 wherein said current measuring means comprises a plurality of electrodes supported within said borehole by said supporting structure at differing distances from said first antenna.

12. In a method of measuring the resistivity of a formation surrounding a borehole having a central axis and which method includes the steps of:
    (a) forming with the aid of a first electromagnetic energy transmitting antenna, a changing primary magnetic field in said formation having a directional null; and
    (b) locating a second antenna to detect the magnetic energy resulting from the current induced in said formation, at a position relative to said directional null at which said magnetic energy is distinguishable from said primary magnetic field.

13. The method of claim 12 wherein said step of locating includes locating said second antenna relative to said directional null to be decoupled from said primary electromagnetic field.

14. The method of claim 12 further including the step of supporting said at least one of said antennas within a groove on the exterior surface of a cylindrical electrically conductive support structure disposed within said borehole.

15. The method of claim 12 or of claim 16 wherein said step of locating further includes locating both of said antennas within said borehole.

16. The method of claim 12 wherein said step of locating includes locating a pair of detecting antennas at opposed positions relative to said central axis.

17. The method of claim 12 wherein said step of locating includes locating at least one of said antennas within said borehole radially off-set from said central axis.

18. The method of claim 12, wherein said step of forming said changing magnetic field includes forming a magnetic field within said formation having a plurality of directional nulls, and said step of locating includes locating each of a plurality of said second detecting antennas at a position selected relative to a corresponding null at which said magnetic energy is distinguishable from said primary magnetic field.

19. The method of claim 18 wherein said step of locating said second detecting antennas includes locating the same symmetrically relative to said transmitting antenna in the direction of said central axis.

20. The method of claim 12 wherein said step of locating includes locating a plurality of said second antennas at differing distances from said transmitting antenna.

21. The method of claim 12 wherein said step of locating includes locating said detecting antenna radially off-set from said central axis.

22. The method of claim 21 wherein said step of locating includes placing both of said detectors at positions which are radially off-set from said central axis.

23. The method of claim 12 wherein said first transmitting antenna is radially off-set from said central axis, and further including the step of measuring different values of current induced within said formation at respectively differing circumferential positions relative to said central axis.

24. The method of claim 12 wherein said step of locating said second antenna to detect the magnetic energy from the current induced in said formation includes adding at least one constant characteristic of a signal to current induced in said second antenna to compensate for signal characteristics caused in said second antenna by said primary magnetic field.

25. In apparatus for measuring the resistivity of a formation surrounding a borehole having a central axis, the combination comprising:
   (a) a first transmitting antenna for electromagnetic energy reactive with said formation;
   (b) supporting structure for said antenna to be placed inn said borehole, which structure has a main axis meant to be generally coincident with said borehole central axis when said structure is in said borehole;
   (c) the location of said first antenna relative to sad support structure being radially off-set from said main axis, said first antenna transmitting changing magnetic energy to induce an electrical current within said formation; and
   (d) means circumferentially off-set from said transmitting antenna for measuring from said borehole, differing values of current induced within said formation at respectively differing distances.

26. The apparatus of claim 25 wherein said current measuring means comprises a plurality of electrodes supported within said borehole by said supporting structure at differing distances from said main axis.

27. The apparatus of claim 25 wherein said support structure is generally cylindrical and said first antenna is positioned in a groove on the exterior surface thereof.

28. The apparatus of claim 25 wherein said first antenna is elongated and positioned on said support structure generally parallel to said main axis.

29. The apparatus of claim 28 wherein said first antenna includes a core of magnetic material surrounded by a coil of electrically conductive material.

30. The apparatus of claim 25 wherein there is an array of said first antennas.

31. In a method of measuring the resistivity of a formation surrounding a borehole having a central axis and which method includes the steps of:
   (a) generating a changing magnetic field in said formation with a first transmitting antenna;
   (b) detecting with a second antenna the magnetic energy resulting from the electrical current induced in said formation; and
   (c) locating at least one of said antennas within said borehole radially off-set from said central axis.

32. The method of claim 31 wherein said first transmitting antenna is radially off-set from said central axis and further including the step of measuring the different values of current induced within said formation at respectively differing radial positions relative to said central axis.

33. The method of claim 31 further including the step of supporting at least one of said antennas within a groove on the exterior surface of a cylindrical magnetically conductive support structure disposed within said borehole.

34. The method of claim 31 wherein said step of generating a changing magnetic field in said formation includes generating a changing magnetic field in said formation having a directional null therein, and said step of locating at least one of said antennas radially off-set from said central axis includes locating the same at a position relative to said null at which said magnetic energy is distinguishable from magnetic energy of said changing magnetic field.

35. The method of claim 34 wherein said step of locating further includes positioning said antenna at a location relative to said null at which it will be generally decoupled from said changing magnetic field.

36. The method of claim 31 wherein said step of generating includes generating a changing magnetic field with an array of aid first transmitting antennas and said step of detecting includes detecting said magnetic energy with an array of said second antennas.

* * * * *